United States Patent
Gopinath

(10) Patent No.: US 7,333,800 B1
(45) Date of Patent: Feb. 19, 2008

(54) METHOD AND SYSTEM FOR SCHEDULING OF SENSOR FUNCTIONS FOR MONITORING OF WIRELESS COMMUNICATION ACTIVITY

(75) Inventor: Krishnamurthy N. Gopinath, Bangalore (IN)

(73) Assignee: AirTight Networks, Inc., Mountain View, CA (US)

( * ) Notice: Subject to any disclaimer, the term of this patent is extended or adjusted under 35 U.S.C. 154(b) by 482 days.

(21) Appl. No.: 11/026,473

(22) Filed: Dec. 29, 2004

Related U.S. Application Data

(60) Provisional application No. 60/608,041, filed on Sep. 8, 2004.

(51) Int. Cl.
*H04M 1/66* (2006.01)

(52) U.S. Cl. .................. 455/411; 370/338; 370/401; 713/157; 713/166; 713/164; 726/22; 726/23; 726/24

(58) Field of Classification Search ............. 455/411, 455/435.1–435, 63.1–63.2, 114.2–114, 410, 455/570, 296; 370/338, 401; 713/157, 166, 713/164; 726/23, 22, 24
See application file for complete search history.

(56) References Cited

U.S. PATENT DOCUMENTS

| | | | |
|---|---|---|---|
| 6,158,010 A * | 12/2000 | Moriconi et al. ............... 726/1 |
| 6,487,416 B1 * | 11/2002 | Bundy et al. ............... 455/453 |
| 6,957,067 B1 * | 10/2005 | Iyer et al. ................. 455/435.1 |
| 6,999,751 B2 * | 2/2006 | Thorson et al. ............. 455/411 |
| 7,093,297 B2 * | 8/2006 | Moore .......................... 726/26 |
| 2001/0048744 A1 * | 12/2001 | Kimura ....................... 380/247 |
| 2002/0039899 A1 * | 4/2002 | Rossman .................... 455/426 |
| 2003/0051173 A1 * | 3/2003 | Krueger ...................... 713/202 |
| 2003/0054800 A1 * | 3/2003 | Miyashita ................... 455/411 |
| 2003/0126462 A1 * | 7/2003 | Howard et al. ............. 713/200 |
| 2003/0126471 A1 * | 7/2003 | Hillis et al. ................. 713/201 |
| 2004/0209634 A1 | 10/2004 | Hrastar |

* cited by examiner

*Primary Examiner*—Rafael Perez-Gutierrez
*Assistant Examiner*—Nimesh Patel
(74) *Attorney, Agent, or Firm*—Airtight Networks; Hemant M. Chaskar

(57) ABSTRACT

A method and a system for scheduling instances of prevention processes for inhibiting undesirable wireless communication of wireless devices is provided. The method includes identifying a wireless device based on a detected undesirable wireless communication. The method can initiate an instance of a prevention process directed to the wireless device so identified. The prevention process can include AP flooding, deauthentication and the like. Preferably, the instance of the prevention process can inhibit the wireless device for certain duration. The method includes setting an inhibited time interval. Preferably, the inhibited time interval is associated with the duration for which the wireless device is inhibited due to the instance of the prevention process. Moreover, the method can perform scanning for other undesirable wireless communication and/or access point functionality during at least a portion of the inhibited time interval.

33 Claims, 5 Drawing Sheets

METHOD AND SYSTEM FOR SCHEDULING OF SENSOR FUNCTIONS FOR MONITORING OF WIRELESS COMMUNICATION ACTIVITY

CROSS-REFERENCES TO RELATED APPLICATIONS

This present application claims priority to the U.S. Provisional Application No. 60/608,041, titled "A method and a system for scheduling sensor resources for monitoring and prevention", filed on Sep. 8, 2004, commonly assigned, and which is hereby incorporated by reference for all purposes.

The present invention also relates to U.S. Ser. No. 10/931,499, titled "A Method and a System for Regulating, Disrupting and Preventing Access to the Wireless Medium", filed on Aug. 31, 2004; which in turn claims priority to the U.S. Provisional Application No. 60/560,034, titled "A Method and a System for Reliably Regulating, Disrupting and Preventing Access to Wireless Medium Through Distributed Passive and Active Wireless Sensors", filed on Apr. 6, 2004, commonly assigned, and which is hereby incorporated by reference for all purposes.

BACKGROUND OF THE INVENTION

The present invention relates generally to wireless computer networking techniques. In particular, the invention provides for protecting local area networks with wireless extensions from unauthorized or harmful wireless activity. More particularly, methods and systems are provided for scheduling functions on sensor devices that are used for monitoring of wireless activity in such networks. These techniques can be applied to many computer networking environments, e.g. environments based upon the IEEE 802.11 family of standards (WiFi), Ultra Wide Band (UWB), IEEE 802.16 (WiMAX), Bluetooth, and others.

Computer systems have proliferated from academic and specialized science applications to day-to-day business, commerce, information distribution and home applications. Such systems can include personal computers (PCs) to large mainframe and server class computers. Powerful mainframe and server class computers run specialized applications for banks, small and large companies, e-commerce vendors, and governments. Personal computers can be found in many offices, homes, and even local coffee shops.

The computer systems located within a specific local geographic area (e.g. an office, building floor, building, home, or any other defined geographic region (indoor and/or outdoor) are typically interconnected using a Local Area Network (LAN)(e.g. the Ethernet). The LANs, in turn, can be interconnected with each other using a Wide Area Network (WAN)(e.g. the Internet). A conventional LAN can be deployed using an Ethernet-based infrastructure comprising cables, hubs switches, and other elements.

Connection ports (e.g. Ethernet ports) can be used to couple multiple computer systems to the LAN. For example, a user can connect to the LAN by physically attaching a computing device (e.g. a laptop, desktop, or handheld computer) to one of the connection ports using physical wires or cables. Other types of computer systems, such as database computers, server computers, routers, and Internet gateways, can be connected to the LAN in a similar manner. Once physically connected to the LAN, a variety of services can be accessed (e.g. file transfer, remote login, email, WWW, database access, and voice over IP).

Using recent (and increasingly popular) wireless technologies, users can now be wirelessly connected to the computer network. Thus, wireless communication can provide wireless access to a LAN in the office, home, public hot-spot, and other geographical locations. The IEEE 802.11 family of standards (WiFi) is a common standard for such wireless communication. In WiFi, the 802.11b standard provides for wireless connectivity at speeds up to 11 Mbps in the 2.4 GHz radio frequency spectrum; the 802.11g standard provides for even faster connectivity at about 54 Mbps in the 2.4 GHz radio frequency spectrum; and the 802.11a standard provides for wireless connectivity at speeds up to 54 Mbps in the 5 GHz radio frequency spectrum.

Advantageously, WiFi can facilitate a quick and effective way of providing a wireless extension to an existing LAN. To provide this wireless extension, one or more WiFi access points (APs) can connect to the connection ports either directly or through intermediate equipment, such as WiFi switch. After an AP is connected to a connection port, a user can access the LAN using a device (called a station) equipped with WiFi radio. The station can wirelessly communicate with the AP.

In the past, security of the computer network has focused on controlling access to the physical space where the LAN connection ports are located. The application of wireless communication to computer networking can introduce additional security exposure. Specifically, the radio waves that are integral to wireless communication often cannot be contained in the physical space bounded by physical structures, such as the walls of a building.

Hence, wireless signals often "spill" outside the area of interest. Because of this spillage, unauthorized users, who could be using their stations in a nearby street, parking lot, or building, could wirelessly connect to the AP and thus gain access to the LAN. Consequently, providing conventional security by controlling physical access to the connection ports of the LAN would be inadequate.

To prevent unauthorized access to the LAN over WiFi, the AP can employ certain techniques. For example, in accordance with 802.11, a user is currently requested to carry out an authentication handshake with the AP (or a WiFi switch that resides between the AP and the existing LAN) before being able to connect to the LAN. Examples of such handshake are Wireless Equivalent Privacy (WEP) based shared key authentication, 802.1x based port access control, and 802.11i based authentication. The AP can provide additional security measures such as encryption and firewalls.

Despite these measures, security risks still exist. For example, an unauthorized AP may connect to the LAN and then, in turn, allow unauthorized users to connect to the LAN. These unauthorized users can thereby access proprietary/trade secret information on computer systems connected to the LAN without the knowledge of the owner of the LAN. Notably, even if the owner of the LAN enforces no WiFi policy (i.e. no wireless extension of the LAN allowed at all), the threat of unauthorized APs still exists. Moreover, even if an unauthorized AP is not LAN-connected, it may still pose a security threat. Specifically, authorized clients in communication with the unauthorized AP may be unwittingly providing proprietary/trade secret information to the unauthorized AP. Additional security threats include, but not limited to, unauthorized ad-hoc wireless connections and denial of service (DOS) attacks. It is also often necessary to be able to protect LAN from multiple occurrences of security breaches. Notably, it is also often required to be able to detect new occurrences of breaches while attempting to contain the currently detected security breaches. In one embodiment, the sensor and access point functionality can be provided in a single wireless device. Then, it may be required to be able to perform access point functionality while attempting to contain the security breaches.

Additionally, there is a need to protect LANs with wireless extensions from harmful wireless activity. For example, harmful wireless activity can degrade the performance of shared wireless link. The harmful activity can result from misconfigured devices, non-standard devices, unauthorized devices etc.

From the above, techniques for protecting local area networks with wireless extensions from unauthorized or harmful wireless activity are highly desired.

BRIEF SUMMARY OF THE INVENTION

According to the present invention, techniques related to wireless computer networking are provided. In particular, the invention provides for protecting local area networks with wireless extensions from unauthorized or harmful wireless activity. More particularly, methods and systems are provided scheduling functions on sensor devices that are used for monitoring of wireless activity in such networks. These techniques can be applied to many computer networking environments, e.g. environments based upon the IEEE 802.11 family of standards (WiFi), Ultra Wide Band (UWB), IEEE 802.16 (WiMAX), Bluetooth, and others.

The application of wireless communication to computer networking has introduced significant security risks. For example, the radio waves that are integral to wireless communication can "spill" outside a region within which local area computer network is operated (e.g. office space, building etc.). Unfortunately, unauthorized wireless devices can detect this "spillage". Moreover, unauthorized wireless devices can surreptitiously operate within the local area network. These devices can pose serious security threats to the network due to their signal spillage. Additional security threats include unauthorized ad-hoc connections and DOS attacks. Also there can often be possibility of multiple occurrences of security breaches. Further, wireless medium being a shared resource, harmful wireless activity from misconfigured, non-standard or unauthorized devices can degrade the performance of wireless network. Therefore, as computer networks with wireless extensions become more ubiquitous, users are increasingly concerned about unauthorized or harmful wireless devices, whether within or outside the region of operation of the local area network.

Accordingly, the present invention provides techniques for monitoring of wireless activity within and in the vicinity of the region of local area network operation. They can advantageously detect unauthorized (i.e. intrusion detection) or harmful (e.g. impacting the performance of wireless network) wireless activity. Additionally, they can inhibit the detected unauthorized or harmful wireless devices from engaging in wireless communication (i.e. prevention process) by creating hindrance (i.e. electronically) to their communication. This facilitates containing the security breach or performance degradation until permanent (e.g. manual) remediation.

In accordance with one aspect of the present invention, a method is provided for scheduling instances of prevention processes for inhibiting undesirable wireless communication of wireless devices. The method includes identifying a wireless device based on a detected undesirable wireless communication. The method can initiate an instance of a prevention process directed to the wireless device so identified. The prevention process can include AP flooding, deauthentication and the like. Preferably, the instance of the prevention process can inhibit the wireless device for certain duration. The method includes setting an inhibited time interval. Preferably, the inhibited time interval is associated with the duration for which the wireless device is inhibited due to the instance of the prevention process. Moreover, the method can perform at least one of scanning for other undesirable wireless communication, access point functionality, and initiating instance of another prevention process directed to another wireless device during at least a portion of the inhibited time interval.

According to another aspect of the present invention, the method includes accessing a knowledge library, which includes information about the prevention process associated with the wireless device. Preferably, the information is indicative of the duration for which the wireless device is inhibited due to the instance of the prevention process. In one embodiment, the method includes setting the inhibited time interval for the wireless device using the information from the knowledge library. According to yet another aspect of the present invention, the method includes setting the inhibited time interval for the wireless device based on desired level of prevention.

According to another aspect of the present invention, the method includes confirming if the wireless device is inhibited after initiating the instance of the prevention process. Additionally, the method can include monitoring if the wireless device is active around the expiration of the inhibited time interval.

In accordance with yet a further aspect of the present invention, the method can inhibit multiple wireless devices while continuing to scan for yet other undesirable wireless communication and/or to perform access point functionality.

Alternatively, the present invention provides a system including one or more computer memories for carrying out certain functionality described herein. The one or more memories include computer code and other processing features.

Certain advantages and/or benefits may be achieved using the present invention. For example, the present technique provides an easy to use process that relies upon conventional computer hardware and software technologies. In some embodiments, the method and the system can be used for intrusion detection/performance monitoring and prevention processes using one radio transmitter/receiver of a sensor device. This can advantageously facilitate detection of additional security/performance threats while currently detected threats are being contained. Additionally, the method and the system can be used for performing access point functionality and prevention processes using one radio transmitter/receiver of a sensor device. In some embodiments, the method and the system can be used to inhibit multiple detected unauthorized and/or harmful devices using one radio transmitter/receiver on a sensor device. This increases the potency of the security monitoring system. Depending upon the embodiment, one or more of these benefits may be achieved. These and other benefits will be described in more throughout the present specification and more particularly below.

DETAILED DESCRIPTION OF THE INVENTION

According to the present invention, techniques related to wireless computer networking are provided. In particular, the invention provides for protecting local area networks with wireless extensions from unauthorized or harmful wireless activity. More particularly, methods and systems are provided for scheduling functions on sensor devices that are used for monitoring of wireless activity in such networks. These techniques can be applied to many computer networking environments, e.g. environments based upon the IEEE 802.11 family of standards (WiFi), Ultra Wide Band (UWB), IEEE 802.16 (WiMAX), Bluetooth, and others.

Conventional security of a computer network has focused on controlling access to the physical space where the local area network (LAN) connection ports are located. The application of wireless communication to computer networking has introduced new security risks. Specifically, the radio waves that are integral to wireless communication often cannot be contained within the physical boundaries of the region of operation of a local area network (e.g. an office space or a building). This "spillage" can be detected by unauthorized wireless devices outside the region of operation. Additionally, unauthorized wireless devices can be operating within the local area network, and can even be connected to the local area network. The radio coverage of such devices that spills outside the region of operation can be used by devices outside the region to gain unauthorized access to the local area network. These devices can pose serious security threats to the network due to their signal spillage. Additional security threats include unauthorized ad-hoc connections and DOS attacks. Also there can often be possibility of multiple simultaneous instances of security breaches. Further, wireless medium being a shared resource, harmful wireless activity emanating from misconfigured, non-standard or unauthorized devices can degrade the performance of wireless network. As computer networks with wireless extensions become more ubiquitous, users are increasingly concerned about unauthorized or harmful wireless devices, whether within or outside the region of operation of the local area network.

Figure 1:
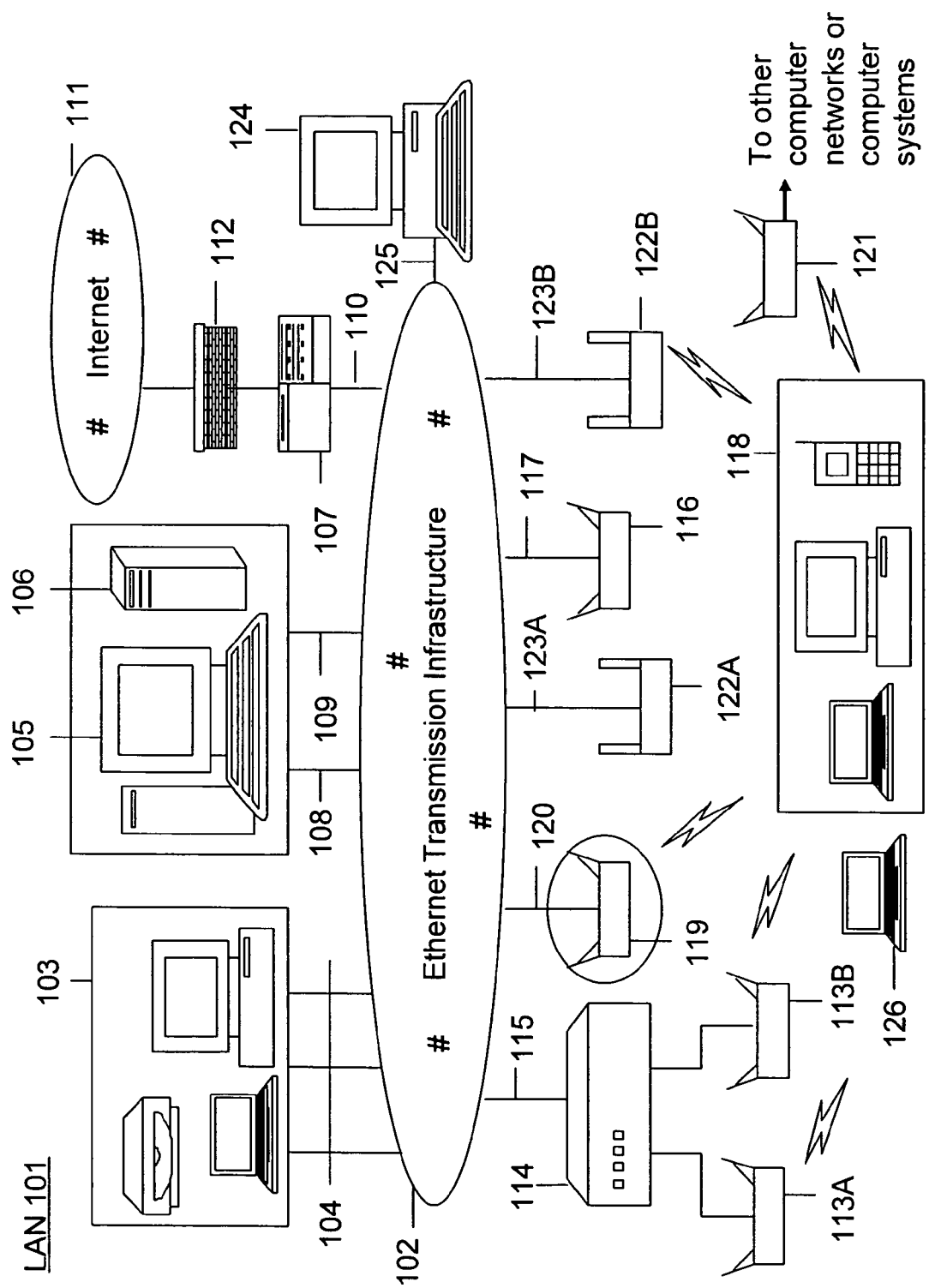
FIG. 1 illustrates a simplified LAN architecture that can facilitate monitoring of the wireless activity according to an embodiment of the present invention.

FIG. 1 illustrates a simplified local area network (LAN) 101 that can facilitate security monitoring. This diagram is merely an example, which should not unduly limit the scope of the claims herein. One of ordinary skill in the art would recognize many variations, modifications, and alternatives. In LAN 101, a core transmission infrastructure 102 can include various transmission components, e.g. Ethernet cables, hubs, and switches. In a typical deployment, the core transmission infrastructure 102 can comprise one or more network segments.

According to one embodiment, a network segment can refer to an IP "subnetwork" (called "subnet"). Each subnet is identified by a network number (e.g. IP number and subnet mask) and plurality of subnets are interconnected using router devices. In an alternative embodiment, a network segment can refer to a virtual local area network (VLAN) segment (e.g. in accordance with IEEE 802.1Q standard). Notably, the plurality of network segments of the LAN 101 can be geographically distributed (e.g. in offices of a company in different geographic locations). The geographically distributed segments can be interconnected via virtual private network (VPN).

One or more connection ports (e.g. Ethernet sockets) are provided on each of the segments for connecting various computer systems to the LAN 101. Thus, one or more end user devices 103 (such as desktop computers, notebook computers, telemetry sensors etc.) can be connected to LAN 101 via one or more connection ports 104 using wires (e.g. Ethernet cables) or other suitable connection means.

Other computer systems that provide specific functionalities and services can also be connected to LAN 101. For example, one or more database computers 105 (e.g. computers storing customer accounts, inventory, employee accounts, financial information, etc.) may be connected to LAN 101 via one or more connection ports 108. Additionally, one or more server computers 106 (computers providing services, such as database access, email storage, HTTP proxy service, DHCP service, SIP service, authentication, network management etc.) may be connected to LAN 101 via one or more connection ports 109.

In this embodiment, a router 107 can be connected to LAN 101 via a connection port 110. Router 107 can act as a gateway between LAN 101 and the Internet 111. Note that a firewall/VPN gateway 112 can be used to connect router 107 to the Internet 111, thereby protecting computer systems in LAN 101 against hacking attacks from the Internet 111 as well as enabling remote secure access to LAN 101.

In this embodiment, a wireless extension of LAN 101 is also provided. For example, authorized APs 113A and 113B can be connected to LAN 101 via a switch 114. Switch 114 in turn can be connected to a connection port 115. Switch 114 can assist APs 113A and 113B in performing certain complex procedures (e.g. procedures for authentication, encryption, QoS, mobility, firewall etc.) as well as provide centralized management functionality for APs 113A and 113B. Note that an authorized AP 116 can also be directly connected to LAN 101 via a connection port 117. In this case, AP 116 may perform necessary security procedures (such as authentication, encryption, firewall, etc.) itself.

In this configuration, one or more end user devices 118 (such as desktop computers, laptop computers, handheld computers, PDAs, etc.) equipped with radio communication capability can wirelessly connect to LAN 101 via authorized APs 113A, 113B, and 116. Notably, authorized APs connected to the LAN 101 provide wireless connection points on the LAN. Note that WiFi or another type of wireless network format (e.g. UWB, WiMax, Bluetooth, etc.) can be used to provide the wireless protocols.

As shown in FIG. 1, an unauthorized AP 119 can also be connected to LAN 101 using a connection port 120. Unauthorized AP 119 could be a malicious AP, a misconfigured AP, or a soft AP. A malicious AP refers to an AP operated by a person having physical access to the facility and connected to LAN 101 without the permission of a network administrator. A misconfigured AP refers to an AP allowable by the network administrator, but whose configuration parameters are, usually inadvertently, incorrectly configured. Note that an incorrect configuration can allow intruders to wirelessly connect to the misconfigured AP (and thus to LAN 101). A soft AP typically refers to a WiFi-enabled computer system connected to a connection port, but also functioning as an AP under the control of software. The software can be either deliberately run on the computer system or inadvertently run in the form of a virus program. Notably, the unauthorized APs create unauthorized wireless connection points on the LAN.

Unauthorized AP 119 may pose any number of security risks. For example, unauthorized AP 119 may not employ the right security policies or may bypass security policy enforcing elements, e.g. switch 114. Moreover, an intruder, such as unauthorized station 126 can connect to LAN 101 and launch attacks through unauthorized AP 119 (e.g. using the radio signal spillage of unauthorized AP outside the defined geographic region).

FIG. 1 also shows another unauthorized AP 121 whose radio coverage spills into the region of operation the concerned LAN. According to a specific embodiment, the AP 121 can be an AP in the neighboring office that is connected or unconnected to the neighbor's LAN, an AP on the premises of LAN 101 that is not connected to the LAN 101 and other APs, which co-exist with the LAN and share the airspace without any significant and/or harmful interferences. According to another specific embodiment, the AP 121 can be hostile AP. Notably, even though not connected to LAN 101, unauthorized AP 121 may lure authorized stations into communicating with it, thereby compromising their security. The hostile AP may lure authorized wireless stations into connecting to it and launch man-in-the-middle, DOS, and other kinds of disruptive attacks.

Additionally, APs and wireless stations (authorized or unauthorized) can generate harmful wireless activity. For example, a misconfigured wireless station may not employ the correct protocol to access the shared wireless medium. As another example, an unauthorized wireless station or an AP may generate excessive wireless traffic over the wireless medium. Such harmful wireless devices can degrade the performance of the wireless network.

In accordance with one aspect of the invention, a security and performance monitoring system can protect LAN 101 from an unauthorized or harmful user (i.e., unauthorized/harmful AP or unauthorized/harmful station). The security and performance monitoring system can include one or more RF sensor/detection devices (e.g. sensor devices 122A and 122B, each generically referenced herein as a sensor 122) disposed within or in a vicinity of a selected geographic region comprising LAN 101. In one embodiment (shown in FIG. 1), sensor 122 can be connected to LAN 101 via a connection port (e.g. connection port 123A/123B). In another embodiment, sensor 122 can be connected to LAN 101 using a wireless connection.

A sensor 122 is able to capture wireless activity that occurs within its reception range. Wireless activity can include any transmission of control, management, or data packets between an AP and one or more wireless stations, or among one or more wireless stations. Wireless activity can even include communication for establishing a wireless connection between an AP and a wireless station (called "association").

In general, a sensor needs to operate on multiple radio channels (e.g. 14 channels in 802.11b, 14 channels in 802.11g, 16 channels in 802.11a etc.). Sensor 122 can listen to a radio channel and capture transmissions on that channel. In one embodiment, sensor 122 can cycle through multiple radio channels on which wireless communication could take place in some order (e.g. round robin, pseudorandom etc.). On each radio channel, sensor 122 can wait and listen for any ongoing transmission. In one embodiment, sensor 122 can operate on multiple radio channels simultaneously.

Whenever a transmission is detected, sensor 122 can collect and record the relevant information about that transmission. This information can include all or a subset of information gathered from various fields in a captured packet (e.g. transmitter and receiver identities, packet type, packet payload etc.). In yet another embodiment, a receive signal strength indicator (RSSI) associated with the captured packet can also be recorded. Other information such as the day and the time the transmission was detected can also be recorded.

The sensor 122 is often provided with a radio transmitter, thereby allowing sensor 122 to transmit packets over the wireless medium, which can cause hindrance to detected unauthorized/harmful device's communication (i.e. to perform prevention process). The radio transmitter could also be used by the sensor 122 for active probing which involves transmission of test signals. In one embodiment, the sensor can also perform access point functionality.

Figure 2:
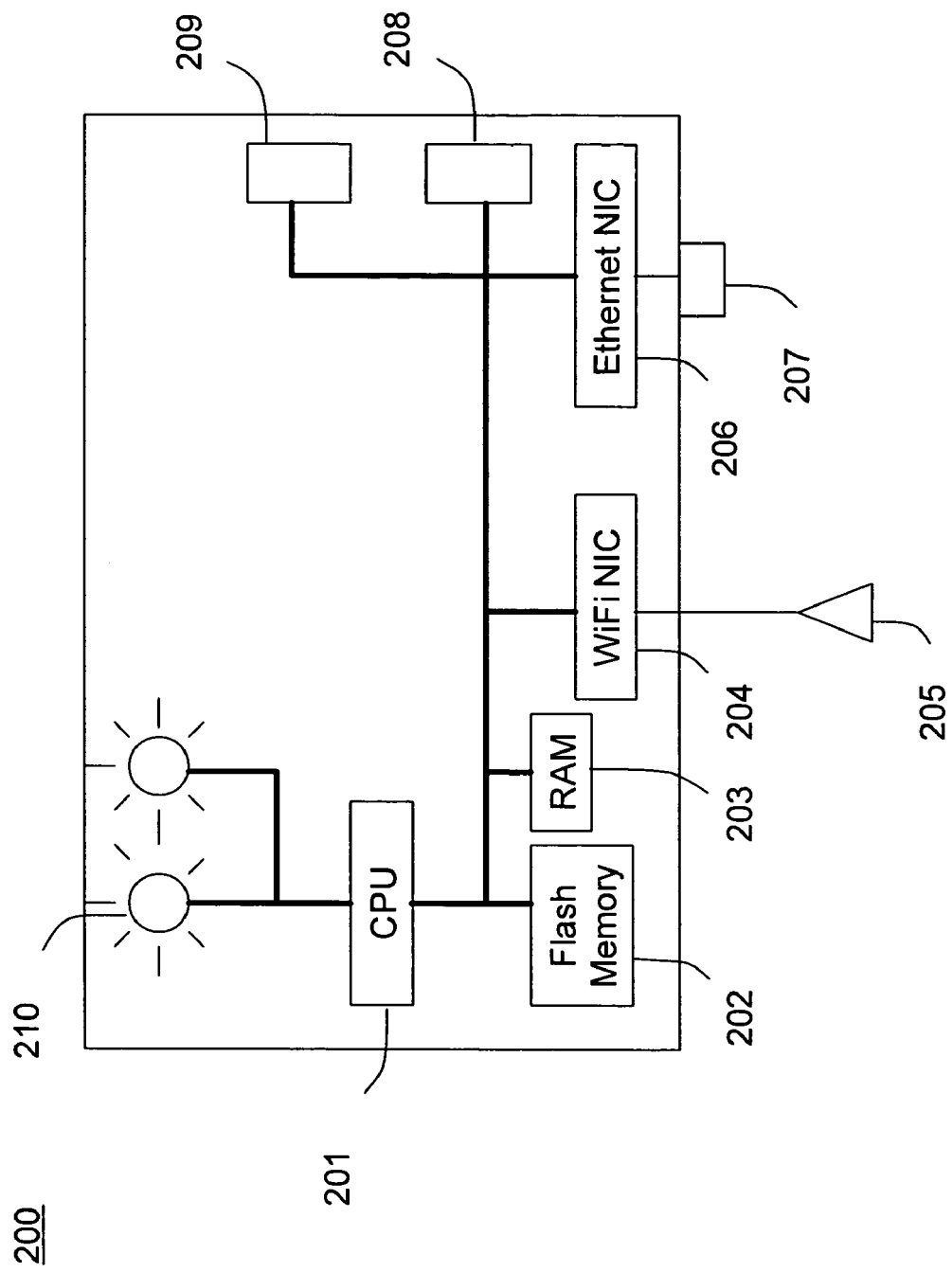
FIG. 2 illustrates exemplary sensor device architecture according to an embodiment of the present invention.

In one embodiment, sensor 122 can be any suitable receiving/transmitting device capable of detecting wireless activity and transmitting prevention packets over the wireless medium. A simplified hardware diagram 200 of the sensor is shown in FIG. 2. This diagram is merely an example, which should not unduly limit the scope of the claims herein. One of ordinary skill in the art would recognize many variations, alternatives, and modifications. As shown, in order to provide the desired detection and recording functionality, sensor 122 can have a processor 201, a flash memory 202 where the software code for sensor functionality resides, and a RAM 203 which serves as volatile memory during program execution. The sensor 122 can have one or more 802.11 wireless network interface cards (NICs) 204, which perform radio and wireless MAC layer functionality, and one or more of dual-band (i.e. for transmission/detection in both the 2.4 GHz and 5 GHz radio frequency spectrums) antennas 205 coupled to the wireless NICs. Each of the wireless NICs 204 can operate in a, b, g, b/g or a/b/g mode. Moreover, the sensor 122 can have an Ethernet NIC 206 which performs Ethernet physical and MAC layer functions, an Ethernet jack 207 such as RJ-45 socket coupled to the Ethernet NIC for connecting the sensor device to wired LAN with optional power over Ethernet or POE, and a serial port 208 which can be used to flash/configure/troubleshoot the sensor device. A power input 209 is also provided. One or more light emitting diodes (LEDs) 210 can be provided on the sensor device to convey visual indications (such as device working properly, error condition, unauthorized wireless activity alert, security breach containment indication and so on).

In one embodiment, sensor 122 can be built using a hardware platform similar to that used to build an AP, although having different functionality and software. In one embodiment, to more unobtrusively be incorporated in the defined geographic region, sensor 122 could have a small form factor.

A sensor 122 can be spatially disposed at an appropriate location in the selected geographic region by using heuristics, strategy, and/or calculated guesses. In accordance with one aspect of the invention, an RF (radio frequency) planning tool can be used to determine an optimal deployment location for sensor 122.

Server 124 (also called "security appliance") can be coupled to LAN 101 using a connection port 125. In one embodiment, each sensor 122 can convey its information about detected wireless activity to server 124 (i.e., over one or more computer networks). Server 124 can then analyze that information, store the results of that analysis, and process the results. In another embodiment, sensor 122 may filter and/or summarize its information before conveying it to server 124.

Sensor 122 can also advantageously receive configuration information from server 124. This configuration information can include, for example, the operating system software code, the operation parameters (e.g. frequency spectrum and radio channels to be scanned), the types of wireless activities to be detected, and the identity information associated with any authorized wireless device. Sensor 122 may also receive specific instructions from server 124, e.g. tuning to specific radio channel or detecting transmission of specific packet on a radio channel. In an alternative embodiment, sensor 122 can operate as a standalone monitoring device.

The information associated with the wireless activity that is captured by one or more sensor devices is analyzed to detect unauthorized or harmful wireless activity. If such an activity is detected, one or more wireless devices associated with such wireless activity are identified. The one or more sensor devices can then perform prevention processes to restrict these wireless devices from engaging in wireless communication. In a specific embodiment, certain packets are transmitted from the sensor devices which can cause hindrance to the wireless communication of these devices. By virtue of prevention process, the detected unauthorized/harmful wireless devices are advantageously prevented from inflicting any intrusion attacks, DOS attacks or performance degradation on the local area network until permanent remediation, e.g. until the device is permanently (e.g. physically) removed from the network. Thus for example, if the unauthorized/harmful device is detected in the middle of the night, it can be restrained from communicating until, for example, the system administrator arrives in the morning, and removes it from the vicinity of the network.

In one embodiment, the prevention process includes 'AP flooding'. The AP flooding works by overwhelming the AP's computational resources by sending multiple connection requests from the sensor device. Commonly found practical implementations of AP maintain certain state about the wireless stations connected to the AP. This state will typically be maintained in a fixed size data structure. Thus the number of connections an AP can service is limited, as merely an example, 128 in case of Intersil Prism chipset based HostAP (e.g. Linksys PCMCIA card) or 256 in case of Cisco 350 series AP. Once the limit on the number of connections an AP can service is reached, new connections cannot be accommodated by the AP for a certain duration of time. Thus, AP flooding can be used to bring down unauthorized AP so that wireless stations cannot connect to it.

In one embodiment, for AP flooding the sensor can initiate multiple connections to the AP. Initiating a connection with AP often includes completing authentication and association stages as defined in 802.11 standard. For initiating a connection, the sensor transmits authentication request packet and association request packet with arbitrary source address and the AP's MAC address as the destination address. In another embodiment, the source address in each of the authentication request packet and the association request packet can be a selected MAC address. Preferably, the selected MAC address is the MAC address of a wireless station that can initiate, or has initiated in past, connection with the AP.

In one embodiment, the AP does not enforce any authentication mechanism, i.e., it always grants authentication request (often called 'open authentication'). In this embodiment, the sensor can successfully complete both the stages and establish connection with the AP. In an alternative embodiment, the AP enforces WEP shared key authentication. In this embodiment, the sensor can reuse the credentials it has derived by monitoring previous authentication transaction between the AP and some wireless station. This is a well known technique for cracking authentication credentials in WEP shared key authentication. In yet an alternative embodiment (often called EAP or 802.1x authentication), the authentication stage is split in two parts. The first stage is open authentication which occurs before association. The second stage is real authentication where credentials are checked and it is performed after association. In this embodiment, the sensor can perform open authentication stage and association stage. It may not be able to successfully perform the second authentication stage due to lack of knowledge of credentials (it is not easy to crack credentials in EAP authentication by monitoring previous authentication transaction). The association state in the AP will then be maintained until a timeout happens on second authentication stage.

In one embodiment, the prevention process includes 'deauthentication', which can break the existing wireless connection between the AP and the wireless station. In one embodiment, the deauthentication includes sending one or more spoofed 'deauthentication' packets and/or 'disassociation' packets from the sensor device with the AP's MAC address as source address with a reason code 'Authentication Expired' to the wireless station or to a broadcast address. In another embodiment, the deauthentication process includes sending one or more spoofed deauthentication packets and/or disassociation packets from the sensor device to the AP with the wireless station's MAC address as the source address with reason code "Auth Leave".

Any prevention process (e.g. AP flooding, deauthentication and the like) requires a sensor device to tune onto the radio channel on which a wireless device to be inhibited is operating. The sensor can then transmit packets on this radio channel to apply an instance of the prevention process. Notably, an instance of the prevention process can inhibit the wireless device for certain duration of time. Hence, the sensor must apply instances of the prevention process periodically so as to inhibit the wireless device for extended duration.

Sensor devices employing the conventional method of cycling through multiple radio channels (e.g. in round robin fashion, pseudorandom fashion etc.) can fail to tune to the required channel at the required instant of time to apply a prevention process. For example, a sensor device that scans 20 radio channels in the round robin fashion and dwells on each channel for 200 ms can tune to a given channel again only once every 4 seconds. Hence, it cannot reliably inhibit a wireless device for which instances of the prevention process need to be applied every 1 second. Further, the frequency at which multiple instances of prevention processes need to be applied for reliable prevention varies across different models of wireless devices manufactured by different vendors.

In certain conventional techniques, the sensor device often locks onto a selected radio channel in order to apply consecutive instances of the prevention process in quick succession. These conventional techniques suffer from many limitations. For example, the sensor can fail to monitor other radio channels for additional unauthorized or harmful activity. This may enable an intruder to bring in one unauthorized device as decoy in order to engage the sensor on one radio channel and perform unauthorized activity on a different radio channel. Additionally, the conventional techniques often use all computational resources on a sensor device to apply instances of prevention process directed to one wireless device. Thus, they are not able to mitigate multiple security breaches, whether on the same or different radio channels.

The present invention provides a much improved technique, which enables the sensor device to perform other functions such as scanning other channels, inhibiting other wireless devices, performing access point functionality etc. between instances of prevention process directed to a selected wireless device. Additionally, reliability of prevention process is not compromised.

Figure 3:
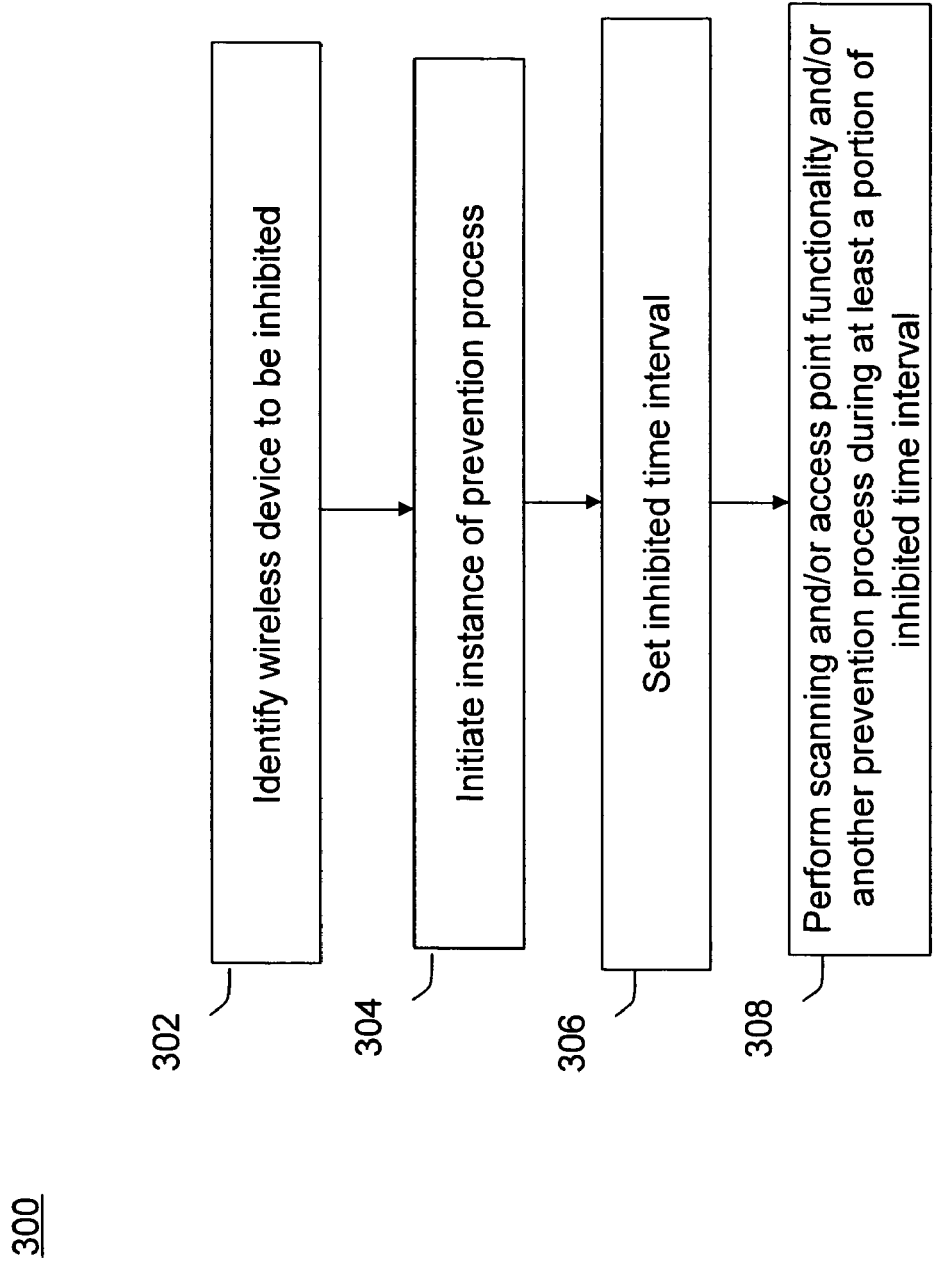
FIG. 3 illustrates a simplified method for scheduling instances of prevention process according to an embodiment of the present invention.

Accordingly, a method is provided for scheduling instances of prevention processes for inhibiting undesirable wireless communication of wireless devices. This simplified method 300 is illustrated in FIG. 3. This diagram is merely an example, which should not unduly limit the scope of the claims herein. One of ordinary skill in the art would recognize other variations, modifications, and alternatives.

As shown, step 302 can identify a wireless device based on a detected undesirable wireless communication. In one embodiment, a MAC address in the transmitter or receiver address fields in the packet captured over the wireless medium is used to identify the wireless device. Step 304 can initiate an instance of a prevention process directed to the wireless device. The prevention process can include AP flooding, deauthentication and like. Moreover, step 306 can set an inhibited time interval.

In one embodiment, the inhibited time interval is preferably indicative of the duration of time for which the wireless device can be inhibited by an instance of the prevention process (i.e. inhibited time). In one embodiment, the inhibited time information is derived from the knowledge library, which stores inhibited time information associated with the prevention process and the wireless device. In another embodiment, the inhibited time interval is indicative of desired level of prevention. As merely an example, the larger the desired level of prevention, the smaller the inhibited time interval. As merely an example, the desired level of prevention can be high, medium or low, corresponding respectively to the wireless device being substantially inhibited, moderately inhibited or marginally inhibited. For example, at marginally inhibited level, the wireless device may be able to perform file transfer, web browsing etc. with hindrances. At moderately inhibited level, the wireless device may not be able to perform file transfer, but may be able to perform short data burst type applications such as remote login with hindrances. At substantially inhibited level, the wireless device may not be able to conduct any meaningful communication.

Step 308 can perform functions such as scanning for other undesirable wireless communication, access point functionality, initiating instance of prevention process directed to another wireless device etc. during at least a portion of the inhibited time interval.

The above sequence of steps provides a method according to an embodiment of the present invention. Alternatively, the present invention provides a system including one or more computer memories for carrying out certain functionality described herein. The one or more memories include computer code and other processing features. As shown, the method uses a combination of steps including a way of scheduling instances of prevention processes in sensor devices used in monitoring of wireless computer networks. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Figure 4:
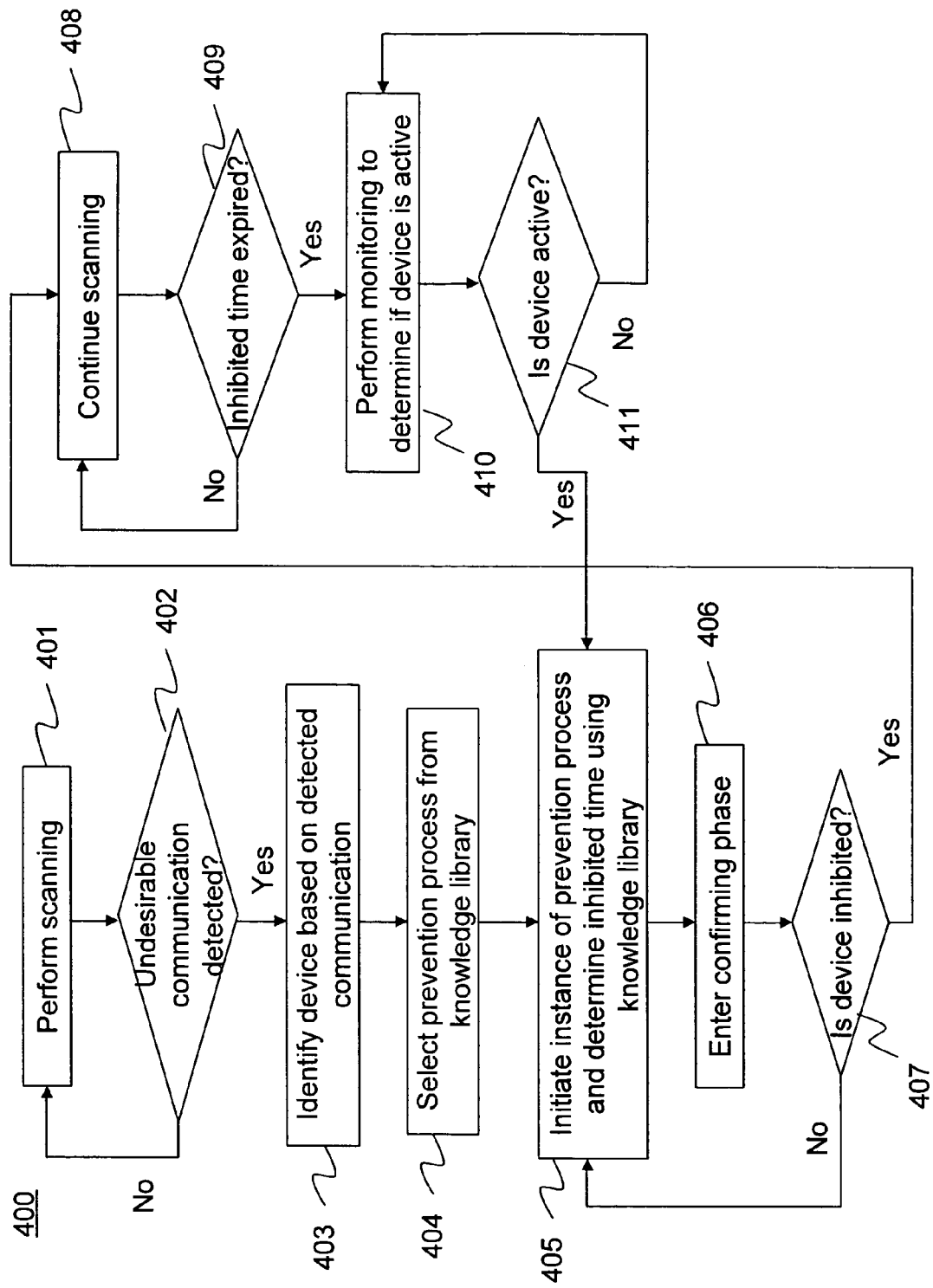
FIG. 4 illustrates a simplified method for scanning and prevention according to a specific embodiment of the present invention.

A simplified method 400 for performing scanning and prevention according to a specific embodiment of the present invention is illustrated in FIG. 4. This diagram is merely an example, which should not unduly limit the scope of the claims herein. One of ordinary skill in the art would recognize other variations, modifications, and alternatives. As shown, step 401 can perform scanning of radio channels to capture wireless activities on those channels. The captured wireless activity can be analyzed to detect undesirable wireless communication, as shown in step 402. In one embodiment, beacon packets transmitted by an AP can be captured. The information provided in the beacon packets (e.g. MAC address, SSID etc.) is analyzed to determine if the AP is authorized. In another embodiment, the rate of certain types of packets such as association request packets from a specific wireless device is monitored to identify DOS attack. In yet another embodiment, the traffic transmitted/received by a specific wireless device is monitored to identify harmful wireless device. In yet a further alternative embodiment, direct communication between two or more wireless stations which are not access points is monitored to determine ah hoc connection. Many other types of analyses are also possible.

When undesirable communication is detected, step 403 can identify a wireless device based on detected undesirable wireless communication. In one embodiment, a MAC address in the transmitter or receiver address fields in the packet captured over the wireless medium is used to identify the wireless device. In another embodiment, a vendor and/or model information of the wireless device is derived from the MAC address. For example, the three selected bytes in the MAC address often contain vendor and/or model specific values. As another example, beacon packets or probe response packets of APs often contain vendor and/or model specific fields which can facilitate this identification.

Step 404 can select a prevention process from a knowledge library. The knowledge library can include information about one or more prevention processes associated with specific wireless devices. Notably, wireless devices (APs, client radio cards etc.) from different vendors and of different models, even though standard compliant (e.g. compliant to 802.11 standard), often exhibit different behavior as regards the effect of prevention process on them. These differences can be due to differences in their implementation details (e.g. hardware, firmware, software etc.). Additionally, the behavior of different pieces of equipment from a given vendor and of a given model as regards the effect of prevention process is often similar. Thus, in one embodiment, the knowledge library can include information associated with effect (e.g. applicability, inhibited time etc.) of one or more prevention processes on wireless devices of specific models and/or from specific vendors. As merely an example, the knowledge library can include information associated with the downtime of an AP from a selected vendor and of a selected model, after an instance of AP flooding is applied (i.e. after the AP is overwhelmed with connection requests). As another example, the knowledge library can include information about the time it takes for a wireless station (e.g. client radio card from a selected vendor and of a selected model) to initiate a new connection (often called 'reassociation') to an AP after applying an instance of deauthentication process (i.e. after the previous connection has been severed using the deauthentication process).

The knowledge library can also provide additional information (e.g. various parameter values, specific manner in which the prevention process is to be applied etc.) associated with prevention process. As merely an example, the knowledge library can include information about total number of connections that an AP from selected vendor and of a selected model can service before running out of computational resources.

In one embodiment, the knowledge library can be created by conducting experiments on different wireless devices in laboratory environment to record the effect of the prevention process on them. In another embodiment, the knowledge library can be created and/or updated based on actual observations in operational network. Exemplary knowledge library is shown below:

Knowledge library for AP flooding:
   Cisco AP 350 series: Connection Limit=256, Inhibited Time=30 minutes.
   HostAP (Linksys PCMCI Prism Based): Connection Limit=128, Inhibited Time=5 minutes.
   Netgear AP WGR101: Connection Limit=64, Inhibited Time=until manual remediation.
   ABC AP: Connection Limit=64, Inhibited Time=4 minutes.
   ABC AP with unsuccessful authentication: Connection Limit=64, Inhibited Time=45 seconds.
   Linksys WAP 55AG: Connection Limit=128, Inhibited time=10 seconds.
   Proxim AP 600 series: Technique Not Applicable. AP removes old connections to accept newer ones.
   Cisco 1200 series AP: Technique Not Applicable. AP removes old connections to accept newer ones with stronger signal.

Knowledge library for deauthentication:
   Cisco Aironet client card: Inhibited Time=300 milliseconds.
   Linksys client card (Prism Based): Inhibited Time=1.5 seconds.
   Linksys client card (Atheros Based): Inhibited Time =3.2 seconds.
   Cisco Aironet a/b/g client card: Inhibited Time=2.5 seconds.
   Proxim client card (Atheros Based): Inhibited Time=7.0 seconds.

Merely as an example, if unauthorized AP is identified to be Cisco 350 series AP, it is preferable to use AP flooding to block it. This is because, according to the knowledge library, AP flooding is effective against this type of AP as well as it causes prolonged downtime. As another example, if unauthorized AP is detected to be Proxim 600 series AP, then according to the knowledge library, AP flooding is not effective. Then, deauthentication prevention process may be required. As yet another example, if unauthorized AP is detected to be ABC AP, then according to knowledge library, the downtime is 4 minutes if connections can be successfully established with it and 45 seconds if they cannot be (i.e. second authentication stage cannot be performed).

Step 405 can initiate instance of prevention process. Additionally, it can determine inhibited time due to the instance of prevention process using the knowledge library. As merely as example, if instance of AP flooding is applied on Cisco 350 series AP, according to the knowledge library, the inhibited time is about 30 minutes. As another example, if instance of deauthentication is applied to sever connection between Proxim 600 series AP and Linksys Prism based client card, the inhibited time is about 1.5 seconds. After initiating an instance of the prevention process, the method can enter confirming phase as shown by step 406.

The confirming phase is directed to ensure that the wireless device is indeed inhibited due to application of an instance of the prevention process, as shown by step 407. In one embodiment, the confirming can include waiting on the radio channel to detect any wireless activity associated with the wireless device. If no wireless activity is detected for a selected duration, the device is inferred to be inhibited and method can proceed to step 408. In an alternative embodiment, active probing is performed during the confirming phase. For example, if AP flooding is used in step 405, the sensor can transmit additional connection requests during the confirming phase. If a response is received from AP with reason code such as 'association denied as AP is unable to handle new requests', the AP can be inferred to be successfully inhibited and method can proceed to step 408. As another example, if deauthentication is used in step 405, the sensor can transmit a packet to the AP with the wireless station's MAC address as source address. If a response is received from AP with reason code such as 'non-authenticated station', the connection between the AP and the wireless station is inferred to be successfully severed and method can proceed to step 408.

As shown, at step 408 the sensor device can continue scanning one or more channels. This is preferably to detect additional undesirable wireless communication. In one alternative embodiment, the sensor device performs access point functionality in addition to or instead of scanning at step 408. In one specific embodiment, the scanning can continue until the expiration of the inhibited time as shown by step 409.

When the inhibited time expires, at step 410 the method can perform monitoring to determine if the wireless device is active. Preferably, the monitoring is performed by the sensor device. The monitoring can be based on passive listening, active probing or combination thereof. In one embodiment, the monitoring can continue until the wireless device becomes active again as shown by step 411 (or a timeout occurs) at which point another instance of prevention process (e.g. step 405) is initiated. In one embodiment, monitoring ensures that the wireless device has become active again for initiating another instance of prevention process. This is because, in some embodiments, the prevention process may not work against inactive device. As merely an example, deauthentication may not have desirable effect unless the connection between the AP and the wireless station has re-established. In another embodiment, the result of monitoring can be used to update knowledge library (not shown in FIG. 4). For example, if monitoring shows that the device remains inactive for a time interval significantly different from the inhibited time as currently provided in the knowledge library, the inhibited time information in the knowledge library can be updated. In some embodiments, the updating can facilitate dynamically updating and/or growing the knowledge library.

The above sequence of steps provides a method according to an embodiment of the present invention. Alternatively, the present invention provides a system including one or more computer memories for carrying out certain functionality described herein. The one or more memories include computer code and other processing features. As shown, the method uses a combination of steps including a way of scheduling instances of prevention processes in sensor devices used in monitoring of wireless computer networks. Of course, other alternatives can also be provided where steps are added, one or more steps are removed, or one or more steps are provided in a different sequence without departing from the scope of the claims herein. Additionally, the various steps can be implemented using a computer code or codes in software, firmware, hardware, or any combination of these. Depending upon the embodiment, there can be other variations, modifications, and alternatives.

Figure 5:
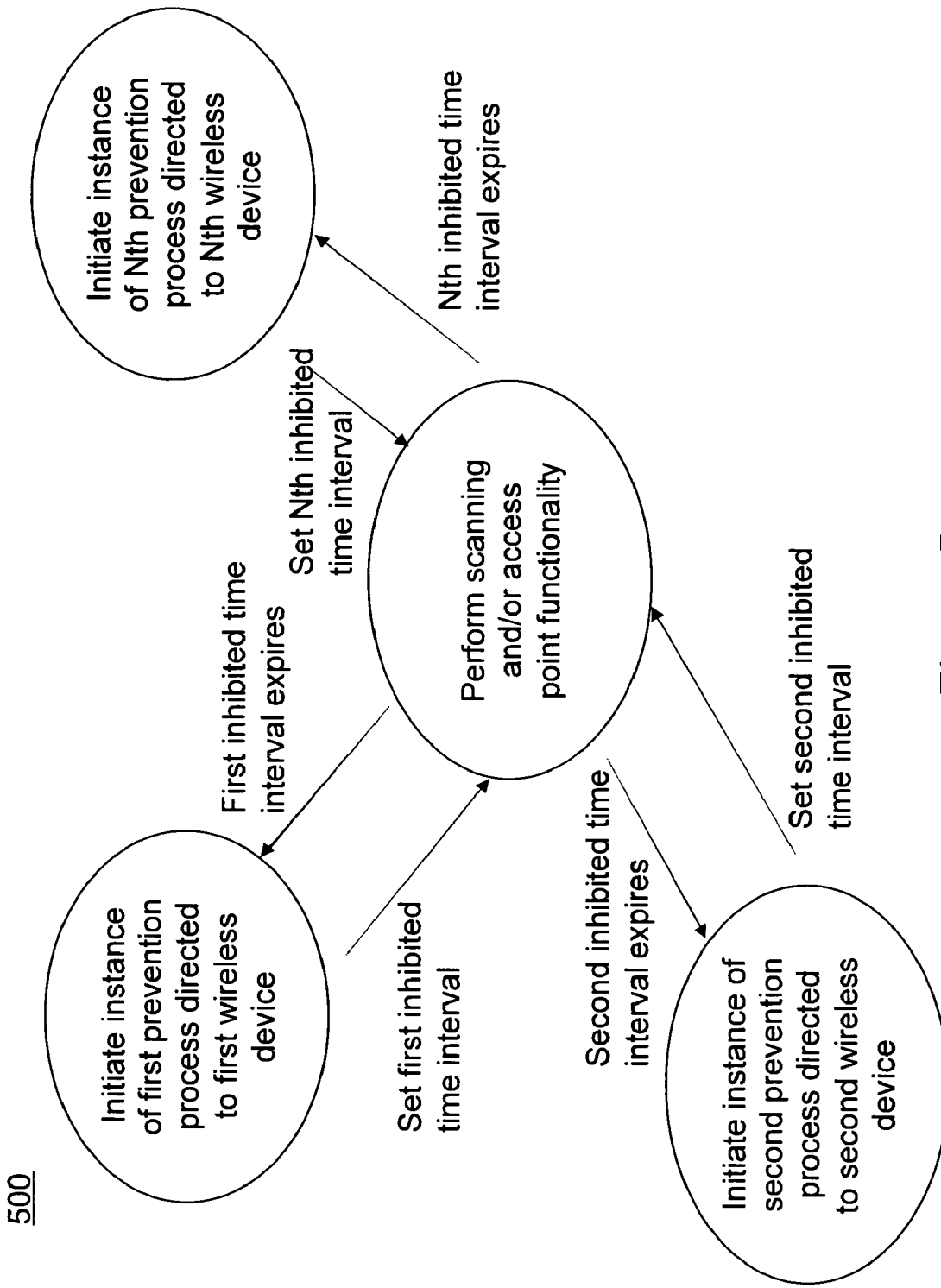
FIG. 5 illustrates a simplified method for inhibiting wireless communication of multiple wireless devices and performing scanning according to a specific embodiment of the present invention.

In one embodiment, the present invention can provide for inhibiting multiple wireless devices, while continuing to scan radio channels and/or perform access point functionality. A simplified method 500 for performing prevention of multiple wireless devices and scanning according to a specific embodiment of the present invention is illustrated in FIG. 5. As shown, the method initiates instance of a prevention process directed to a specific wireless device. The method can set inhibited time interval for that wireless device and enter scanning phase. In an alternative embodiment, access point functionality can be performed in addition to or instead of scanning. When inhibited time interval for any wireless device expires, the method initiates another instance of prevention process directed to that wireless device.

The various embodiments of the present invention may be implemented as part of a computer system. The computer system may include a computer, an input device, a display unit, and an interface, for example, for accessing the Internet. The computer may include a microprocessor. The microprocessor may be connected to a data bus. The computer may also include a memory. The memory may include Random Access Memory (RAM) and Read Only Memory (ROM). The computer system may further include a storage device, which may be a hard disk drive or a removable storage drive such as a floppy disk drive, optical disk drive, jump drive and the like. The storage device can also be other similar means for loading computer programs or other instructions into the computer system.

As used herein, the term 'computer' may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term 'computer'. The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms 'software' and 'firmware' are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for scheduling instances of prevention processes for inhibiting undesirable wireless communication of wireless devices, the method comprising:
   identifying a first wireless device based on a detected undesirable wireless communication;
   determining a first inhibited time interval for the first wireless device for a first prevention process, the first inhibited time interval being indicative of an interval of time for which the first wireless device is inhibited from wirelessly communicating upon applying an instance of the first prevention process on the first wireless device, the applying the instance of the first prevention process including transmitting one or more wireless signals from a sniffer device to interfere with wireless communication of the first wireless device;
   initiating a first instance of the first prevention process for inhibiting the first wireless device by transmitting one or more first wireless signals from the sniffer device;
   setting a first timeout interval based at least upon the first inhibited time interval;
   performing scanning from the sniffer device for undesirable wireless communication from other wireless devices during at least a portion of the first timeout interval; and
   initiating a second instance of the first prevention process for inhibiting the first wireless device by transmitting one or more second wireless signals from the sniffer device upon termination of the first timeout interval.

2. The method of claim 1, wherein the first wireless device is an access point device.

3. The method of claim 1, wherein the first wireless device is a station.

4. The method of claim 1, wherein the first prevention process includes access point flooding.

5. The method of claim 1, wherein the first prevention process includes deauthentication.

6. The method of claim 1, further including confirming the first wireless device is inhibited after initiating the first instance of the first prevention process.

7. The method of claim 6, wherein if the first wireless device is active as determined by the confirming, then initiating a third instance of the first prevention process and updating the first timeout interval.

8. The method of claim 1, further including performing another function in addition to the scanning during at least a portion of the first timeout interval.

9. The method of claim 8, wherein the other function includes performing access point functionality.

10. The method of claim 1, further including initiating a first instance of a second prevention process directed to a second wireless device, the second wireless device detected to be involved in undesirable wireless communication.

11. The method of claim 1, wherein if another undesirable wireless communication is detected during the scanning, then
- identifying a second wireless device based on the other detected undesirable wireless communication;
- determining a second inhibited time interval for the second wireless device for a second prevention process;
- initiating a first instance of the second prevention process for inhibiting the second wireless device;
- setting a second timeout interval for the second wireless device based at least upon the second inhibited time interval;
- performing scanning for undesirable wireless communication from other wireless devices during at least a portion of the second timeout interval; and
- initiating a second instance of the second prevention process for inhibiting the second wireless device upon termination of the second timeout interval.

12. The method of claim 11, wherein the first and the second prevention processes are different.

13. The method of claim 11, wherein the first and the second prevention processes are the same, and lengths of the first and the second timeout intervals are the same.

14. The method of claim 11, wherein the first and the second prevention processes are the same, but lengths of the first and the second timeout intervals are different.

15. The method of claim 1, wherein the identifying includes determining vendor and/or model information about the first wireless device.

16. The method of claim 1, wherein the identifying includes determining a MAC address of the first wireless device.

17. A method for performing scanning and inhibiting functions in a sensor device, the sensor device capable of monitoring wireless activity in a computer network, the method comprising:
- (a) identifying a wireless device to be targeted for inhibiting;
- (b) accessing a knowledge library including information regarding one or more inhibited time intervals associated with one or more inhibiting functions, respectively, corresponding to specific wireless devices, the one or more inhibiting functions including transferring one or more interfering wireless signals;
- (c) selecting an inhibiting function for the identified wireless device using information from the knowledge library, the information being associated with the identified wireless device;
- (d) performing the inhibiting function at selected time intervals by transferring one or more wireless signals to interfere with wireless communication of the identified wireless device, at least one of the selected time intervals being set based on an inhibited time information derived from the knowledge library, the inhibited time information being associated with the identified wireless device and the selected inhibiting function; and
- (e) scanning channels for wireless activity either in conjunction or interleaved with steps (a), (b), (c), and (d).

18. The method of claim 17, wherein steps (a), (b), (c), and (d) can be performed for multiple wireless devices.

19. The method of claim 17, wherein the identifying includes at least one of determining
- vendor information of the wireless device;
- model information of the wireless device; and
- a system address of the wireless device.

20. The method of claim 17, wherein the inhibiting function includes at least one of AP flooding and deauthentication.

21. A method for scheduling instances of prevention processes for inhibiting undesirable wireless communication of wireless devices, the method comprising:
- identifying a first wireless device based on a detected undesirable wireless communication;
- accessing a knowledge library to ascertain an inhibited time interval affected on the first wireless device upon applying an instance of a first prevention process on the first wireless device, the applying the instance of the first prevention process including transmitting one or more wireless signals from a sniffer device to interfere with wireless communication of the first wireless device;
- initiating a first instance of the first prevention process by transmitting one or more first wireless signals from the sniffer device;
- setting a timeout interval based at least upon the inhibited time interval;
- performing access point functionality from the sniffer device during at least a portion of the timeout interval; and
- initiating a second instance of the first prevention process by transmitting one or more second wireless signals from the sniffer device upon termination of the timeout interval.

22. The method of claim 21, wherein the first prevention process includes access point flooding.

23. The method of claim 21, wherein the first prevention process includes deauthentication.

24. A method for scheduling instances of prevention processes for inhibiting undesirable wireless communication of wireless devices, the method comprising:
- identifying a wireless device based on a detected undesirable wireless communication;
- initiating a first instance of a prevention process directed to the wireless device, the prevention process including transmitting one or more wireless signals to interfere with wireless communication associated with the wireless device;
- setting an inhibited time interval for the wireless device, the setting the inhibited time interval being based upon knowledge of an interval of time for which the wireless device was inhibited from wirelessly communicating upon applying a second instance of the first prevention process, the second instance being applied prior to the first instance; and
- performing at least one of scanning for other undesirable wireless communication, access point functionality, and initiating instance of another prevention process directed to another wireless device during at least a portion of the inhibited time interval.

25. The method of claim 24, wherein the prevention process includes at least one of access point flooding and deauthentication.

26. The method of, claim 24, wherein the identifying includes at least one of determining
- vendor information of the wireless device;
- model information of the wireless device; and
- a system address of the wireless device.

27. The method of claim 24, further including confirming the wireless device is inhibited after initiating the first instance.

28. The method of claim 24, further including monitoring wireless activity associated with the wireless device around expiration of the inhibited time interval.

29. The method of claim 24, wherein the setting the inhibited time interval is further based on desired level of prevention.

30. A computer network including wireless devices, the computer network comprising:
- a sensor for inhibiting undesirable wireless communication of wireless devices, the sensor facilitating:
  - identifying a wireless device based on a detected undesirable wireless communication;
  - determining an inhibited time interval for the wireless device for a prevention process, the inhibited time interval being indicative of an interval of time for which the wireless device is inhibited from wirelessly communicating upon applying an instance of the prevention process on the wireless device, the applying the instance of the prevention including transmitting one or more wireless signals from the sensor to interfere with wireless communication of the wireless device;
- initiating a first instance of the prevention process by transmitting one or more first wireless signals from the sensor;
- setting a timeout interval based at least upon the inhibited time interval;
- performing scanning for undesirable wireless communication from other wireless devices during at least a portion of the timeout interval; and
- initiating a second instance of the prevention process by transmitting one or more second wireless signals from the sensor upon termination of the timeout interval.

31. The method of claim 1, wherein the determining the first inhibited time interval for the first wireless device for the first prevention process includes accessing a database storing inhibited time intervals for prevention processes for wireless devices.

32. The method of claim 24, wherein the knowledge of the interval of time for which the wireless device was inhibited from wirelessly communicating upon applying the second instance is stored in a knowledge library.

33. The method of claim 32, further including accessing the knowledge library to ascertain the interval of time for which the wireless device was inhibited from wirelessly communicating upon applying the second instance.

* * * * *